United States Patent
Yoshida et al.

(10) Patent No.: US 6,744,169 B2
(45) Date of Patent: Jun. 1, 2004

(54) DIRECT CURRENT MOTOR HAVING COMMUTATOR SEGMENTS FIRMLY EMBEDDED IN INSULATION BOND

(75) Inventors: Yasuyuki Yoshida, Chita-gun (JP); Masahiro Katoh, Chiryu (JP); Shinji Usami, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/406,275

(22) Filed: Apr. 4, 2003

(65) Prior Publication Data
US 2003/0218401 A1 Nov. 27, 2003

(30) Foreign Application Priority Data
May 23, 2002 (JP) ........................ 2002-149293

(51) Int. Cl.$^7$ ........................ H02K 13/00; H01R 39/04
(52) U.S. Cl. ........................................ 310/236
(58) Field of Search .................... 310/233–236

(56) References Cited

U.S. PATENT DOCUMENTS 3,450,914 A * 6/1969 Demerciere ............... 310/236
3,486,057 A * 12/1969 Stude et al. ............... 310/235
3,549,927 A * 12/1970 Mann ......................... 310/236
5,497,042 A * 3/1996 Nettelhoff .................. 310/219
5,742,111 A * 4/1998 Reed .......................... 310/236
6,028,381 A * 2/2000 Yumiyama et al. ....... 310/68 C
6,157,108 A * 12/2000 Potocnik et al. ........... 310/235

FOREIGN PATENT DOCUMENTS

JP         A 1-283043      11/1989        ........... 310/233

* cited by examiner

Primary Examiner—Tran Nguyen
(74) Attorney, Agent, or Firm—Oliff & Berridge, PLC

(57) ABSTRACT

A direct current motor includes a stator generating a magnetic field therein and a rotor having an armature and rotating inside the stator. A commutator for supplying electric current to the armature is connected to the rotor. The commutator is composed of plural commutator segments bonded together with an insulating resin material. Each commutator segment includes an anchor portion formed at a radial inside and a projecting portion extending in an axial direction, and both portions are embedded in the insulating resin. The commutator segments are firmly bonded with the insulating resin, and the bonding strength is increased without enlarging the commutator size.

3 Claims, 3 Drawing Sheets

DIRECT CURRENT MOTOR HAVING COMMUTATOR SEGMENTS FIRMLY EMBEDDED IN INSULATION BOND

CROSS-REFERENCE TO RELATED APPLICATION

This application is based upon and claims benefit of priority of Japanese Patent Application No. 2002-149293 filed on May 23, 2002, the content of which is incorporated herein by reference.

BACKGROUND OF THE INVENTION

1. Field of the Invention

The present invention relates to a direct current motor having commutator segments firmly embedded in an insulation bond, and more particularly to such a direct is current motor for use in a starter for cranking an internal combustion engine.

2. Description of Related Art

A direct current motor has been used for driving various kinds of devices, and it is always required to make the direct current motor compact in size. Taking a direct current motor for use in a starter for cranking an internal combustion engine as an example, it has been required to make the direct current motor small in size and to increase its rotational speed. To make the direct current motor small in size, all the components constituting the direct current motor, including a commutator, have to be made small in size.

A commutator composed of plural commutator segments circularly arranged and molded together with thermosetting resin such as epoxy resin is commonly used in a starter motor. Since the commutator connected to a rotor rotates at a high speed, it is necessary to provide the commutator with a sufficient mechanical strength to endure a high centrifugal force. The commutator segments simply bonded with molding resin are not strong enough to endure a high centrifugal force. An individual commutator segment may be separated from the molded commutator due to a high centrifugal force applied thereto when the commutator is rotated at a high speed.

In order to increase the bonding strength of the commutator segments, various proposals have been made. For example, it has been proposed to form a claw on a commutator segment so that the claw is embedded in the molding resin to thereby increase the boding strength against the centrifugal force. However, it is difficult to form such a claw without increasing a size of the commutator because the claw must be formed at a radial inside of the segment where an available space is limited. In other words, it is unavoidable to increase the commutator size to form such a claw having sufficient mechanical strength.

Another proposal is made in JP-A-1-283043. It proposes to form a projection extending to an opposite side of a riser to which armature coil ends are connected in addition to the claw embedded in the molding resin. However, the projection formed at an opposite side of the riser is not able to sufficiently increase the bonding strength against the centrifugal force. This is because a larger centrifugal force is applied to the riser that has a larger volume than the other portion of the segment. If the segments are peeled off from the bonding resin, brushes contacting the segments will abnormally wear and normal commutation will not be performed.

SUMMARY OF THE INVENTION

The present invention has been made in view of the above-mentioned problem, and an object of the present invention is to provide an improved commutator that has a sufficient strength against a centrifugal force without increasing the size of the commutator. Another object of the present invention is to provide a starter for cranking an internal combustion engine, in which a direct current motor having the improved commutator is used.

A direct current motor is composed of a stator for generating a magnetic field therein, a rotor having armature coils and rotating inside the stator, a commutator connected to the rotor, brushes slidably contacting the commutator for supplying electric current to the armature coils, and other associated components. All the components of the direct current motor are contained in a motor housing. The commutator is composed of plural commutator segments arranged in a circular shape and an insulation bond for boding the commutator segments into a single body of the commutator. The insulation bond is formed by molding a resin material.

Each commutator segment is made of copper and includes an elongate portion contacting the brushes, a portion for connecting ends of the armature coils thereto, an anchor portion embedded in the insulation bond, and a projecting portion also embedded in the insulation bond for increasing a bonding strength against a centrifugal force applied to the commutator. The connecting portion extends in a radial direction from one axial end of the contacting portion. The anchor portion is formed at a radial inside of the contacting portion, and the projecting portion extends from a foot of the connecting portion to the axial direction which is opposite to the direction to which the contacting portion extends.

To further increase the bonding strength, a depressed portion may be formed at one axial end of the anchor portion so that a circular band is disposed in a circular groove formed by depressed portions of plural commutator segments. The circular band is also embedded in the insulation bond. The depressed portions may be formed at both axial ends of the anchor portion so that two circular bands are disposed in the circular grooves formed at both axial ends.

Since not only the anchor portion but also the projecting portion is embedded in the insulation bond, the commutator segments are firmly bonded together with the insulation bond. Therefore, a sufficient bonding strength that endures a large amount of centrifugal force applied to the commutator is secured without enlarging the size of the commutator. The direct current motor rotating at a high speed can be realized without increasing the size. Also, a compact high speed starter for cranking an internal combustion engine is realized by employing the direct current motor according to the present invention.

Other objects and features of the present invention will become more readily apparent from a better understanding of the preferred embodiment described below with reference to the following drawings.

DETAILED DESCRIPTION OF THE PREFERRED EMBODIMENT

Figure 1:
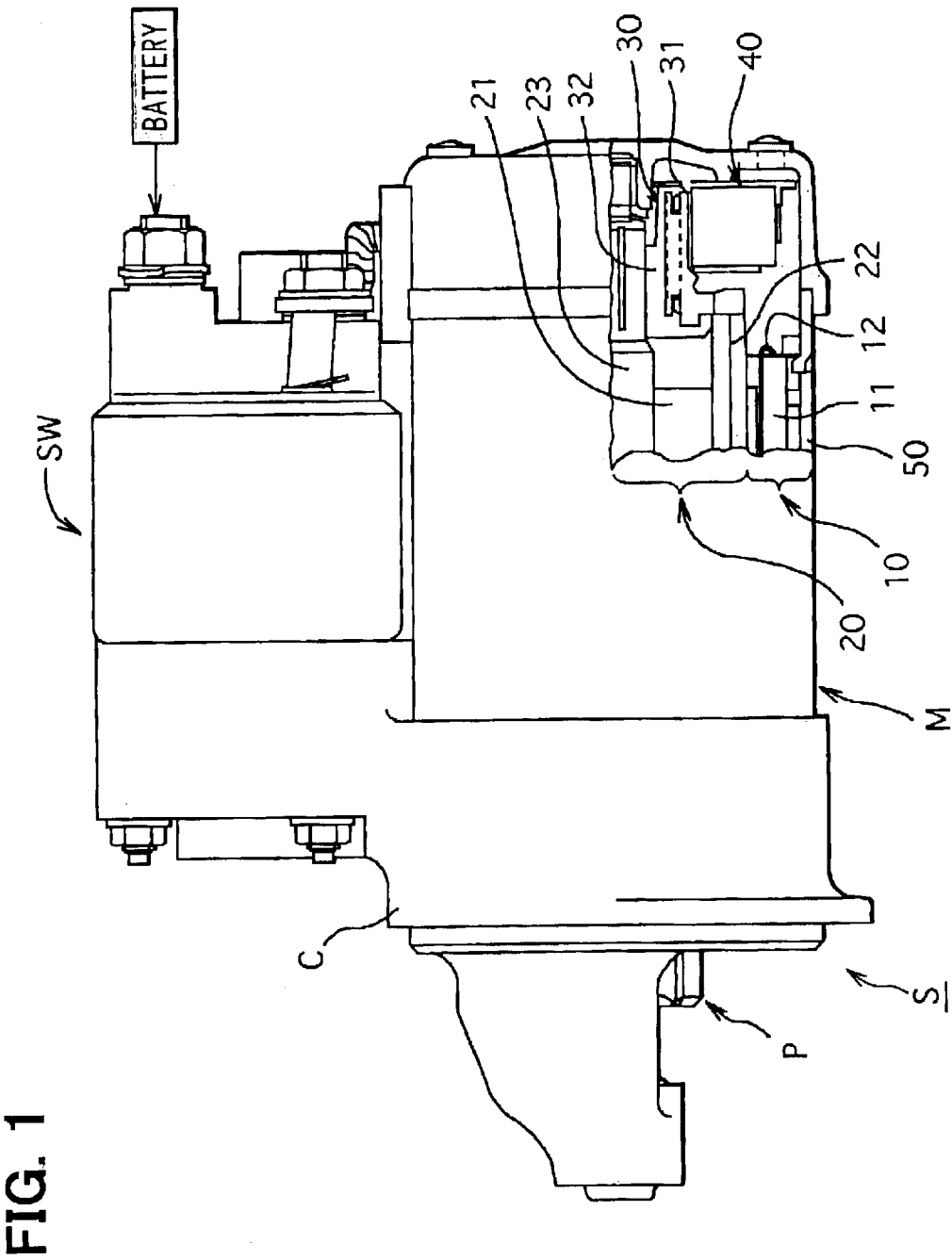
FIG. 1 is a side view showing a starter for cranking an internal combustion engine.

A preferred embodiment of the present invention will be described with reference to the accompanying drawings. First, referring to FIG. 1, an entire structure of a starter S will be briefly described. The starter S is mainly composed of a direct current motor M, a magnetic switch SW, a planetary gear speed reduction mechanism (not shown), an overrunning clutch (not shown), and a pinion gear P. Those components of the starter S are contained in a starter casing C.

Upon turning on an ignition key of an internal combustion engine, the magnetic switch SW is energized to drive a plunger contained in the magnetic switch SW. In response to the plunger movement, relay contacts are closed to supply electric power to the direct current motor M. At the same time, the overrunning clutch and the pinion gear P are driven by the plunger toward a ring gear of the engine (toward the left side of FIG. 1). Thereby, the pinion gear P engages with the ring gear and the engine is cranked up.

The direct current motor M is composed of a stator 10, a rotor 20, a commutator 30, brushes 40, housing 50, and other associated components. The housing 50 also functions as a yoke of the motor M. The stator 10 (details are not shown) includes pole cores 11 press-fitted inside the housing 10 and a field coil 12 wound around the pole cores 11. When direct current is supplied to the field coil 12 from an on-board battery upon closing the magnetic switch SW, a magnetic field is generated in the stator 10. The rotor 20 includes an armature core 21 fixed to a motor shaft 23 and armature coils 22 disposed in slots formed around the outer periphery of the armature core 21. The rotor 20 is disposed inside the stator 10 with a certain air gap therebetween and rotatably supported in the housing 10. Upon closing the magnetic switch SW, direct current is supplied to the armature coils 22 through the commutator 30 and the brushes 40 slidably contacting the commutator 30. Thus, the rotor 20 is rotated in the magnetic field generated in the stator 10.

The commutator 30 is composed of plural commutator segments 31 circularly arranged (29 segments are used in this particular embodiment) and a ring-shaped insulation bond 32 made of molding resin that connects the plural segments 31 into one piece while insulating individual segments 31 from one another. The commutator 30 is connected to the motor shaft 23. The brushes 40 made of metallic graphite are held by a bush holder so that the brushes 40 slidably contact the outer periphery of the commutator 30. In this particular embodiment, four brushes 40 constituting two pairs are used. Each pair of brushes 40 consists of a positive brush connected to a plus terminal of the on-board battery through the magnetic switch SW and a negative brush connected to a ground terminal.

Now, the commutator 30 will be described in detail with reference to FIGS. 2A–3B. As shown in FIG. 2B, plural commutator segments 31 are circularly arranged with equal intervals, and an insulation layer 321 is formed in each space between neighboring two segments 31. The insulation layers 321 are formed integrally with the insulation bond 32 by molding. Each segment 31 is made of copper and substantially L-shaped as better seen in FIG. 3A. The segment 31 includes a contacting portion 311 (that contacts brushes 40), a connecting portion 312 (to be connected to ends of the armature coils 22), a projecting portion 313 (projecting toward the armature side), and an anchor portion 314 (embedded in the insulation bond 32).

The contacting portion 311 is elongated in the axial direction, and has a circular outer surface on which the brushes 40 slide. The connecting portion 312 is formed at the armature side (at the left side of FIG. 2A) of the elongate contacting portion 311 to extend in the radial direction. A slot 312a is formed in the connecting portion 312 as better seen in FIG. 3B. Ends of the armature coils 22 are forcibly inserted into the slot 312a and electrically connected to the connecting portion 312 by fusing. The projecting portion 313 is, projected in the axial direction toward the armature side from a foot portion of the connecting portion 312. The projecting portion 313 has a substantially rectangular-pillar shape. The radial outside and the radial inside of the projecting portion 313 substantially coincide with those of the contacting portion 311, respectively, as better seen in FIG. 3A. The projecting portion 313 is entirely covered with and embedded in the insulation bond 32, as shown in FIG. 2A.

Figure 3A:
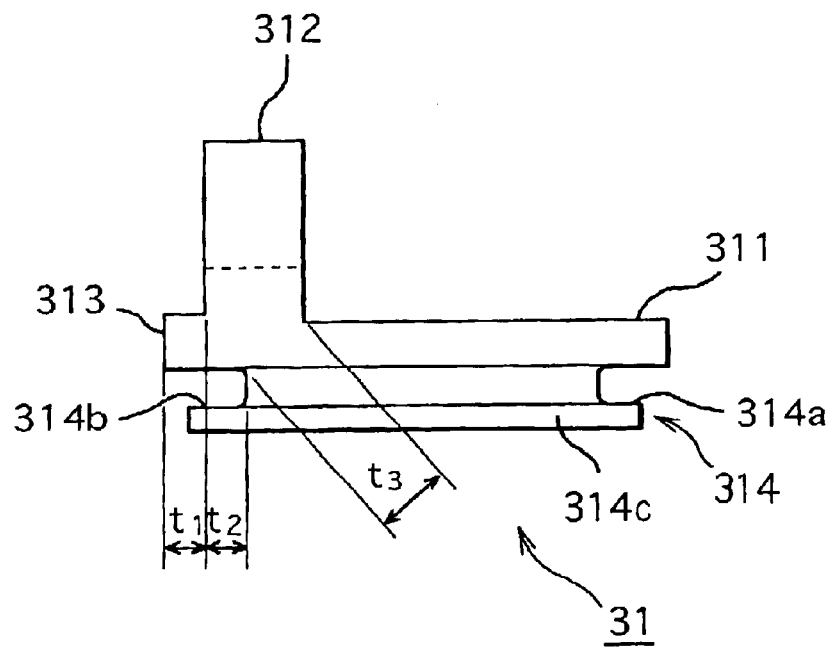
FIG. 3A is a side view showing a commutator segment used in the commutator shown in FIGS. 2A and 2B.
Figure 3B:
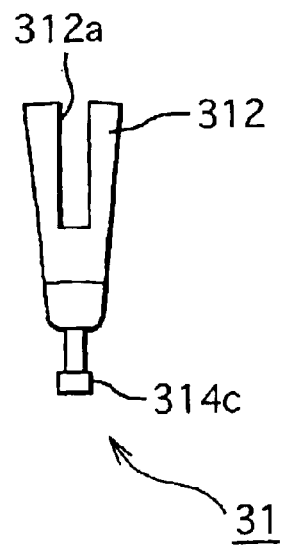
FIG. 3B is an end view of the commutator segment, viewed from the right side of FIG. 3A.

The anchor portion 314 is formed at a radial inside of the contacting portion 311 and in parallel to the contacting portion 311. The anchor portion 314 includes an anchor tail 314c connected to the contacting portion 311 by a wall that is thinner than the anchor tail 314c, as shown in FIGS. 3A and 3B. Depressed portions 314a, 314b are formed at both axial ends of the anchor portion 314. The anchor tail 314c is completely embedded in the insulation bond 32, and the depressed portions 314a, 314b are filled with the insulation bond 32. Therefore, the commutator segments 31 are firmly held by the insulation bond 32, and the bonding strength enduring a high centrifugal force is secured.

Figure 2A:
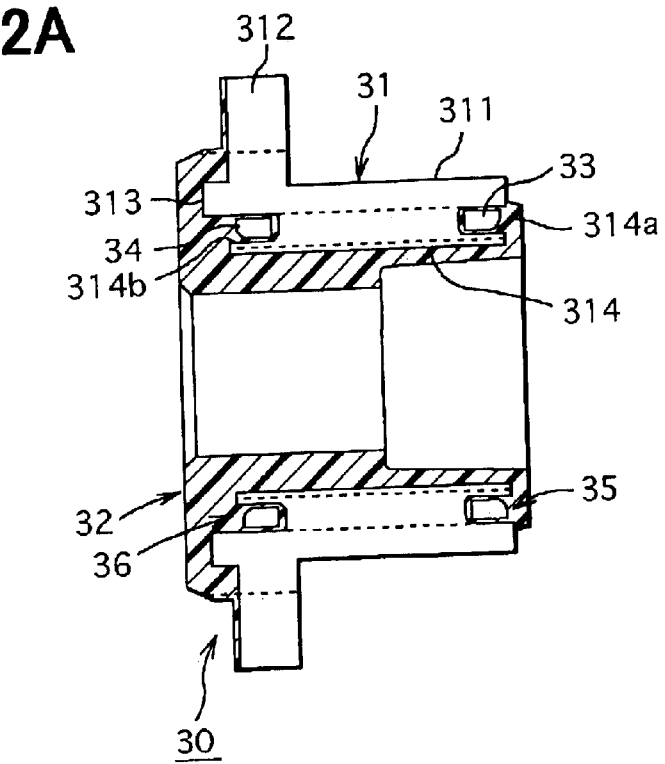
FIG. 2A is a cross-sectional view showing a commutator of a direct current-motor according to the present invention, taken along line IIA—IIA shown in FIG. 2B.
Figure 2B:
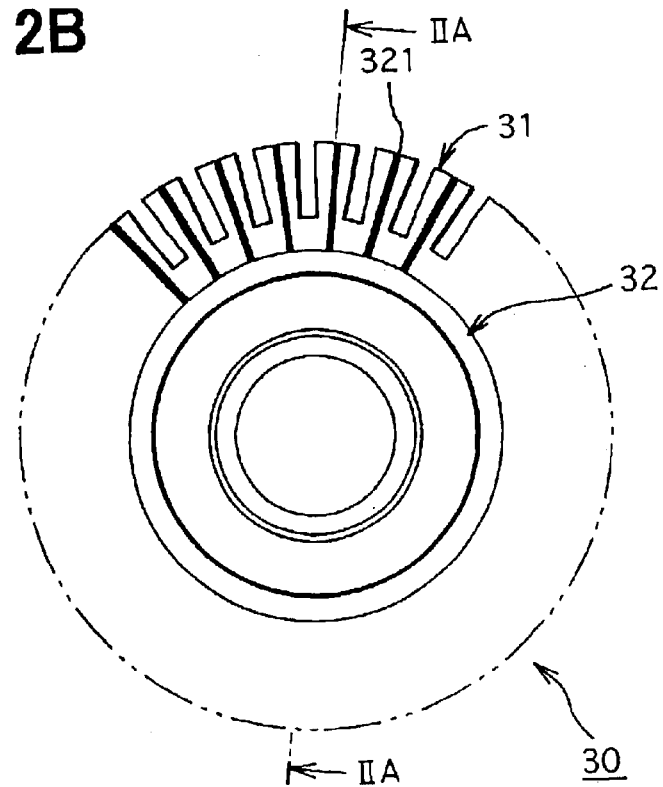
FIG. 2B is a plan view showing the commutator, viewed from the right side of FIG. 2A.

To further enhance the bonding force, circular bands 33, 34 are disposed in circular grooves 35, 36 formed by the depressed portions 314a, 314b at both axial ends of the commutator 30, as shown in FIG. 2A. The circular bands 33, 34 are made of a metallic material coated with an insulating material. The circular bands 33, 34 are also embedded in the insulation bond 32. Thus, the commutator segment 31 is firmly held not only by the anchor portion 314 embedded in the insulation bond 32 but also by the circular bands 33, 34 disposed in the circular grooves 35, 36. It is also possible to use one circular band disposed in a circular groove formed at one axial end of the connecting portion.

As shown in FIG. 3A, an amount of projection t1 of the projecting portion 313 is made equal to or larger than an amount of depression t2 of the depressed portion 314b. As the amount of projection t1 becomes larger, the connecting portion 312 having a large volume can be held by the projecting portion 313 with a higher bonding force. By making the amount of depression t2 smaller, a distance t3 (illustrated in FIG. 3A) can be made larger. Although a high centrifugal force is applied to the foot portion of the connecting portion 312 corresponding to the distance t3, a sufficient bonding strength is secured by making the distance t3 sufficiently long. Since the projecting portion 313 is formed at the armature side, a relatively large space is available for the projecting portion. Accordingly, it is possible to give a large volume to the projecting portion 313 to help heat dissipation of the commutator 30.

According to the present invention, the commutator 30 that endures a high centrifugal force is realized without making its size large. Accordingly, the direct current motor rotating at a high speed can be made small in size. A starter for cranking an internal combustion engine, which rotates at a high speed, can be realized in a small size by using the direct current motor according to the present invention.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A direct current motor, comprising:
    a stator for generating a magnetic field therein;
    a rotor rotating inside the stator, the rotor including an armature core and armature coils held in the armature core;
    a commutator connected to the rotor, the commutator including a plurality of commutator segments circularly arranged and bonded together with an insulation bond;
    brushes slidably contacting the commutator for supplying electric current to the armature coils; and
    a housing containing the stator, the rotor and the brushes therein, wherein:
        each commutator segment comprises: a contacting portion contacting the brushes, the contacting portion being elongated in an axial direction of the commutator; a connecting portion having a slot open to a radial outside of the commutator, the connecting portion being extended in a radial direction of the commutator from one end of the contacting portion, ends of the armature coils being forcibly inserted into the slot from the radial outside of the slot and electrically connected thereto; a projecting portion embedded in the insulation bond, the projecting portion being projected from a foot portion of the connecting portion in an opposite axial direction to the axial direction in which the contacting portion is elongated; and an anchor portion embedded in the insulation bond, the anchor portion being formed at a radial side of the contacting portion, the anchor portion including a first depressed portion formed at one longitudinal end of the anchor portion remote from the connecting portion and a second depressed portion formed at the other longitudinal end of the anchor portion directly underneath the connecting portion;
        a first circular groove is formed by the first depressed portions when the plurality of the commutator segments are circularly arranged, and a first circular band is disposed in the first circular grove; and
        a second circular groove is formed by the second depressed portions when the plurality of the commutator segments are circularly arranged, and a second circular band is disposed in the first circular groove.

2. The direct current motor as in claim 1, wherein the insulation bond is formed by molding a resin material.

3. A starter for cranking an internal combustion engine, the starter comprising the direct current motor defined in claim 1.

* * * * *